United States Patent [19]

Heath

[11] Patent Number: 4,570,885

[45] Date of Patent: Feb. 18, 1986

[54] HANGER CLAMP BODY AND METHOD OF FORMING SAME

[75] Inventor: Richard W. Heath, La Habra, Calif.

[73] Assignee: Tolco, Incorporated, Brea, Calif.

[21] Appl. No.: 533,215

[22] Filed: Sep. 19, 1983

[51] Int. Cl.⁴ .......................... F16L 3/24; B23P 13/00; B21D 9/04

[52] U.S. Cl. ...................................... 248/72; 29/150; 29/526 R; 72/379

[58] Field of Search .............. 29/150, 526 R; 72/379; 248/72

[56] References Cited

U.S. PATENT DOCUMENTS

| | | |
|---|---|---|
| 1,840,216 | 1/1932 | Tormo . |
| 2,675,201 | 4/1954 | Friel . |
| 2,996,570 | 8/1961 | Wilson ............................. 248/72 X |
| 3,126,182 | 3/1964 | Stamper ................... 248/72 |
| 3,276,800 | 10/1966 | Loudon et al. . |
| 3,321,161 | 5/1967 | Hirt . |
| 3,572,623 | 3/1971 | Lapp . |
| 3,874,035 | 4/1975 | Schuplin ................ 248/72 |
| 4,019,705 | 4/1977 | Habuda, Sr. et al. .............. 248/72 X |
| 4,202,083 | 5/1980 | Gutner ................................. 29/150 |

FOREIGN PATENT DOCUMENTS 660026 10/1951 United Kingdom .................. 248/72

Primary Examiner—Charlie T. Moon
Attorney, Agent, or Firm—Knobbe, Martens, Olson & Bear

[57] ABSTRACT

A pipe hanger clamp, formed by bending a flat section of metal bar or plate, has two vertical side members which have been cut so their side view is a "C" shape. The lower arms of these two side members are joined by a horizontally extending end wall about which the side members are bent. Threaded holes in the end wall receive a mounting set screw and a pipe hanger rod for supporting a pipe. An overhead support is clamped between the set screw and the upper arms of the C-shaped side members, such that the load applied to the rod is generally edgewise to the plate thickness, and does not provide an unbending force on the clamp.

2 Claims, 8 Drawing Figures

U.S. Patent  Feb. 18, 1986  4,570,885
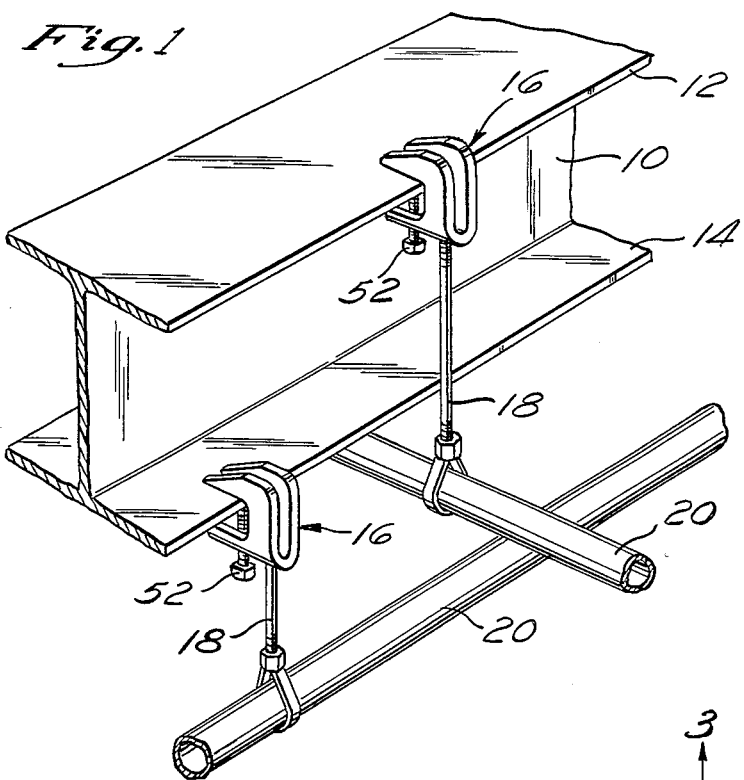
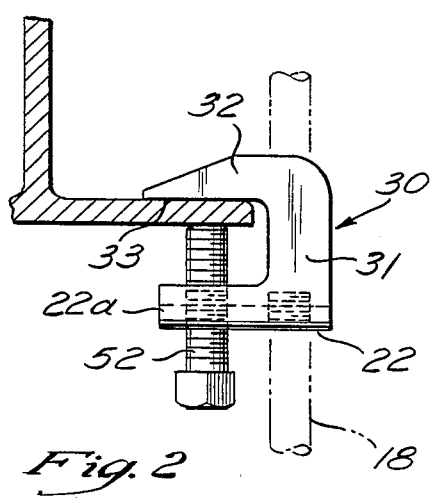
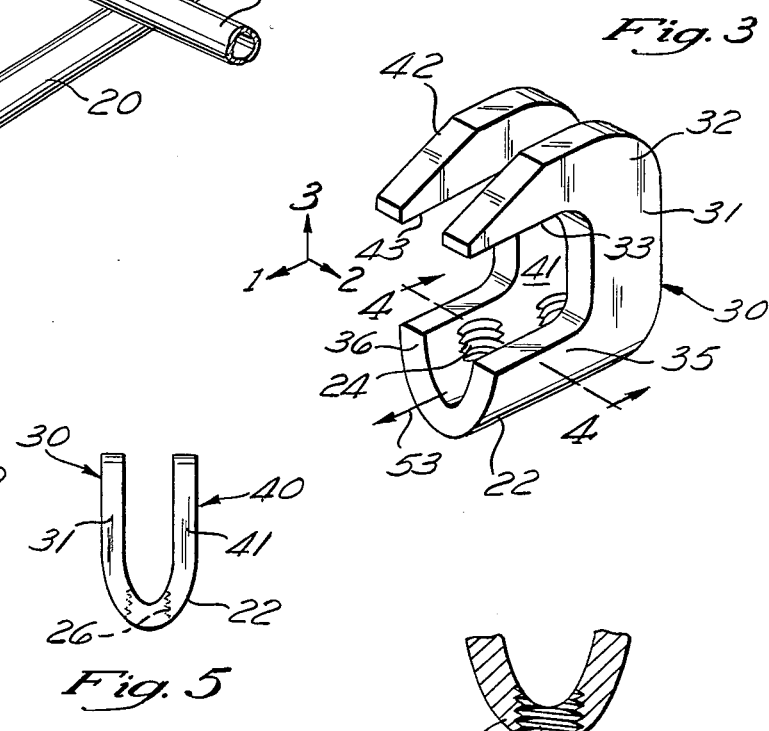
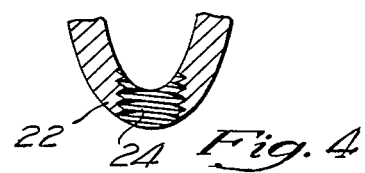
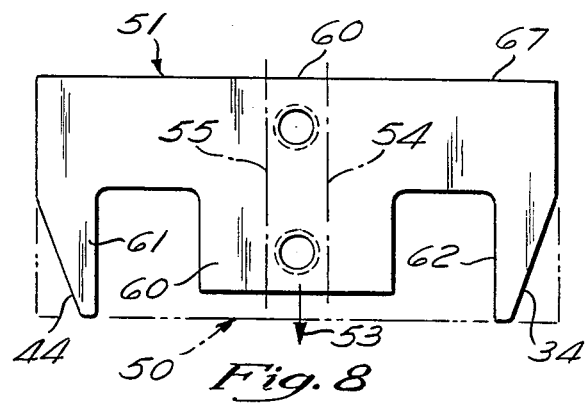

HANGER CLAMP BODY AND METHOD OF FORMING SAME

TECHNICAL FIELD

This invention relates to an improved clamp to attach pipe hangers to overhead structures, and relates to an improved method of making such a clamp.

In the construction and modification of buildings, it is often desirable to suspend piping from the ceiling, one common example being water sprinkler systems. A typical method for attaching a pipe to the ceiling utilizes the flanges of the beams which support the ceiling. A pipe hanger clamp fits over the edge of one of these flanges, and a pipe hanger rod attached to the clamp supports the pipe. This method is convenient because it permits the pipes to be hung after the building has been constructed.

BACKGROUND ART

A number of clamps have been developed, three of which are disclosed in U.S. Pat. Nos. 3,276,800, 3,211,161, and 3,572,623. These three patents generally indicate the state of the prior art. One approach to the manufacture of these clamps utilizes casting. A cast clamp has significant torsional stiffness. However, this manufacturing process is costly if the units are not manufactured in high volume. Another approach contemplates plastically deforming a strip of material, usually steel, into a "U" shape. A hole is drilled into one of the arms of the clamp, and the hole is tapped to accommodate a set screw. When attached, the clamp is oriented so that the rounded portion is directly next to the tip of the supporting flange. This type of clamp can be manufactured inexpensively. However, unless made relatively thick, such a clamp tends to deform under heavy loading—the clamp tends to unbend at the line or lines where it was initially deformed.

SUMMARY OF THE INVENTION

In accordance with the present invention, there is provided a pipe hanger clamp having two cantilevered support arms with clamping surfaces for engaging the same side of an I-beam. The relatively thin support arms have a height which is significantly greater than their width. However, because the support arms are a distance apart, the clamp is securely engaged with the supporting I-beam.

An end wall rigidly joins the two side members. A threaded hole in the end wall accommodates a set screw for securely engaging the support arms with the I-beam. A second threaded hole receives a threaded section of a pipe hanger rod.

In accordance with the method of the invention the clamp is manufactured from a single piece of flat metal bar stock. The plate is first blanked into the desired shape, preferrably an "E" shape. The workpiece is subsequently bent into a "U"-shape about the middle tine of the "E" to form the clamp, which has two side members having a general C-shape.

BRIEF DESCRIPTION OF THE DRAWINGS

FIG. 1 is a perspective view showing two clamps of this invention, each supporting a pipe hanger and a pipe.

FIG. 2 is a side view showing a clamp mounted on a lower flange.

FIG. 3 is a perspective view of the clamp itself.

FIG. 4 is a fragmentary cross-sectional view of the clamp showing a threaded hole through a curved section of the end wall.

FIG. 5 shows an end view of the clamp.

FIG. 6 shows a side view of another form of the clamp of the invention wherein the flat plate is bent at two locations so that the threaded hole pierces a flat section of the end wall.

FIG. 7 is an end view of the clamp of FIG. 6.

FIG. 8 is a top view of the flat metal piece, forming the clamp of FIG. 6, after it has been blanked and drilled, but before it has been bent.

BEST MODE FOR CARRYING OUT THE INVENTION

Referring to FIG. 1, an I-beam 10 with an upper flange 12 and a lower flange 14 supports a pair of hanger clamps 16. A hanger rod 18, attached to a pipe hanger clamp 16, supports a pipe 20. Typically, there are a number of pipes supported in this fashion, with each pipe supported from above at a number of points. Referring to FIGS. 2 and 3, one embodiment of the clamp comprises an end wall 22 joining two spaced, vertically extending side members 30 and 40 each having a generally C-shape. The side members include an upper pair of horizontally extending support arms 32 and 42 cantilevered from vertical body portions 31 and 41, and a lower pair of side wall portions 35 and 36 extending forwardly from the portions 31 and 41 and being joined to the end wall 22. Referring to FIG. 3, the arms 32 and 42 project generally parallel to each other in direction 1. These support arms 32 and 42 have support arm clamping surfaces 33 and 43 for engaging the same side of a supporting member, such as the I-beam flange 14 of FIG. 1. The support arm clamping surfaces 33 and 43 have lengths in direction 1, and widths in lateral direction 2. The support arms 32 and 42 have a height in directions 3 which is mutually perpendicular with directions 1 and 2. The clamp is manufactured so that the width of support arm clamping surfaces 33 and 43 is significantly less than the height of support arms 32 and 42.

The end wall 22, joining the two side members 30 and 40, has a threaded hole 24 aligned below the support arms 32 and 42, to receive a set screw 52, and has threaded hole 26 below the vertical portions 31 and 41 to receive a pipe hanger rod 18. The end wall joins the two side members in such a way that the side members 30 and 40—and therefore the support arm clamping surfaces 33 and 43—are a distance apart. By giving the clamping surfaces a greater lever arm without utilizing a continuous surface, this separation improves the rotational stability of the clamp with respect to the supporting member while minimizing the clamp weight. A single continuous clamp arm will not seat properly if its clamping surface is slightly convex. A characteristic of this design is that the plane formed by the support arm clamping surfaces 33 and 43 is between the end wall 22 and the support arms 32 and 42.

In accordance with one embodiment of the invention, the clamp body is formed by blanking a rectangular piece of metal bar stock 50 indicated by the solid and phantom lines in FIG. 8, into a generally "E"-shaped piece 51 with the height of the middle tine 60 being greater than that of the end tines 61 and 62. The piece is subsequently bent around an axis of curvature 53 of the middle tine 60 to the shape shown in FIGS. 2, 3 and 5. After this bending process, the clamp has a "U"-shaped edge view, as shown in FIG. 5, wherein the center portion of the middle tine 60 forms the end wall 22 and the remainder of the piece 51 forms "C"-shaped side member as viewed in FIG. 2. The end tines 61 and 62 of the E-shaped piece 51 form the support arms 32 and 42, of the C-shaped members 30 and 40, while the arm portions 35 and 36 are formed by portions of the middle tine 60, and the vertical portions of the C-shape side members are formed by the vertical leg of the E-shape.

The workpiece is denominated as being a piece of bar stock solely to indicate that its thickness is less than its length or width, to facilitate the bending process, and is not used to reflect certain thickness specifications. As a typical example, the piece to be blanked could be a plate of 3/16 inch A.I.S.I. 1020 hot rolled steel $4\frac{3}{8}$ inches long and 2 inches wide. For example, from such a metal plate, a clamp is formed having a $\frac{1}{2}$ inch gap between the side members 30 and 40, and having support arm clamping surfaces 33 and 43 with a length four times greater than their width.

After the clamp is bent into the shape shown in FIGS. 3 and 5, two vertically extending threaded holes 24 and 26 are formed through the end wall 22. The threaded hole 24 accommodates a set screw 52 which holds the clamp onto the beam flange, while the threaded hole 26 accommodates a hanger rod 18. As shown in FIG. 4, due to the bending operation, the axial length of threaded hole 26 is greater than the thickness of the plate from which the clamp is formed. This design is advantageous because a deeper threaded portion increases the thread strength, which supports the load of the pipe.

The embodiment of FIGS. 6 and 7 is essentially the same as that of FIGS. 1–5 except that the piece 51 cut from the plate 50 is bent twice, once at 90 degrees around the broken bend line 54 in FIG. 8, and also at 90 degrees around the line 55 to create the "U"-shaped clamp shown in FIG. 7, which has a generally flat end wall 22. Nevertheless, the clamp of FIG. 7 might be thought of as being bent approximately around the axis 53a indicated in FIG. 7.

With this clamp, either a drilling operation or a punching operation can be used to form the holes, which are subsequently tapped to form threaded holes 24 and 26. Moreover, with this approach, the threaded holes 24 and 26 through the end wall 22 may be formed either before or after the bending operation.

When the piece 51 is cut from plate 50, the outer edges 34 and 44 of the support arms 32 and 42 are tapered away from the body members 31 and 41, i.e., toward the tip of the support arms 32 and 42. This enables the clamp to be inserted between the beam flange 12 in FIG. 1 and roofing that may be supported on the beam. When there is ample space, such as on the lower flange, the clamp may be inverted so that the set screw 52 engages the top of the beam flange and the support arm clamping surfaces engage the bottom. Such an orientation facilitates the tightening of the set screw 52 since the rod 18 normally does not interfere with the movement of the wrench used for rotating the screw.

As mentioned above, the primary advantage of the clamp of the invention is that it can be formed from a metal plate by a simple cutting and bending operation. Yet the load on the clamp is edgewise to the plate thickness. Thus the torque produced does not tend to unbend the clamp. This design enables the plate to be thinner than it would be if the torque were in the unbending direction.

What is claimed is:

1. A method of forming a pipe hanger clamp body comprising:

blanking a metal plate into generally an E-shape, having a main body portion, a middle tine and a pair of end tines, said blanking step including cutting the middle tine to form straight edges each parallel to and facing a straight edge on a respective one of said end tines, said blanking step further including cutting said tines so that the dimension of said middle tine perpendicular to said edges is considerably greater than the dimension of said end tines perpendicular to said edges, said blanking step further including cutting the tines so that the length of each of said end tines is greater than the length of said middle tine, and said blanking step further including cutting the outer edges of said end tines, remote from said middle tine, so that said outer edges taper towards the tips of said outer tines so that the outer tines are wedge-shaped;

bending the plate about the middle tine of the E-shape to form a generally U-shaped clamp with a portion of the middle tine forming the bight or end wall of the U-shape and with the remainder of the E-shape forming the legs of the U-shape, each leg forming a generally C-shaped side member joined by the end wall with the portions of the middle tine forming lower support arms of the C-shaped members and with the end tines forming the upper arms of the C-shaped members;

forming a threaded hole through the portion of the end wall formed by said middle tine to receive a set screw extending towards said upper arms so that an overhead support may be clamped between the set screw and said upper arms; and forming a threaded hole in said end wall for receiving a pipe hanger rod, the axis of the rod hole being approximately aligned with the portions of said C-shapes that were formed by the main body portion of the E-shape.

2. A pipe hanger clamp body prepared by the method of claim 1.

* * * * *